United States Patent [19]
Forrest et al.

[11] Patent Number: 5,126,185
[45] Date of Patent: Jun. 30, 1992

[54] CONDUCTIVE SHIELDING AND SEALING TAPE

[75] Inventors: Patrick Forrest, Weissenburg; Ralf Tillmanns, Pleinfeld; Wolfgang Walter, Dornhan, all of Fed. Rep. of Germany; Thomas E. Dykes, Jr., Wilmington; Michael G. Ryan, Newark, both of Del.

[73] Assignee: W. L. Gore & Associates, Inc., Newark, Del.

[21] Appl. No.: 526,414

[22] Filed: May 18, 1990

Related U.S. Application Data

[63] Continuation-in-part of Ser. No. 290,539, Dec. 27, 1988, abandoned.

[30] Foreign Application Priority Data

Dec. 30, 1987 [DE] Fed. Rep. of Germany ... 8717108[U]

[51] Int. Cl.$^5$ .......................... B32B 3/02; B32B 7/12; B32B 15/08
[52] U.S. Cl. .................................. 428/157; 361/218; 428/192; 428/332; 428/343; 428/344; 428/422; 428/463
[58] Field of Search ............... 428/157, 156, 192, 332, 428/421, 422, 343, 220, 344, 463; 52/309.5; 174/102 R; 361/218; 285/110

[56] References Cited

U.S. PATENT DOCUMENTS

| | | |
|---|---|---|
| 2,895,759 | 2/1955 | Conrad et al. |
| 3,400,954 | 1/1967 | Brown ................................ 285/110 |
| 4,071,993 | 2/1978 | Stewart et al. ..................... 52/309.5 |
| 4,187,390 | 2/1980 | Gore .................................. 174/102 R |
| 4,557,957 | 12/1985 | Manniso ........................... 428/422 X |
| 4,582,738 | 4/1986 | Kunert ............................. 428/157 X |
| 4,720,400 | 8/1985 | Manniso . |
| 4,823,229 | 4/1989 | Waterland ........................... 361/218 |

FOREIGN PATENT DOCUMENTS 2919958 5/1979 Fed. Rep. of Germany .
979525 4/1951 France .

OTHER PUBLICATIONS

Electronic Products Division Product Information Bulletin on EMI Shielding GORE-TEX Gasket Tapes ®.

*Primary Examiner*—Thomas J. Herber, Jr.
*Attorney, Agent, or Firm*—Dena Meyer Weker

[57] ABSTRACT

A sealing tape for sealing the gaps between the edge of an opening in an aircraft fuselage and the lid closing said opening comprising a sealing tape that is a one-piece porous polymeric material having a relatively wide flat portion and a narrower enlarged bulb portion. In addition, the porous polymeric material may be filled or plated with metal powder or filings so that the one-piece sealing tape is rendered conductive.

12 Claims, 1 Drawing Sheet

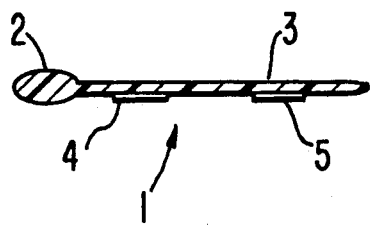
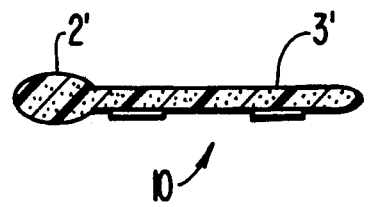
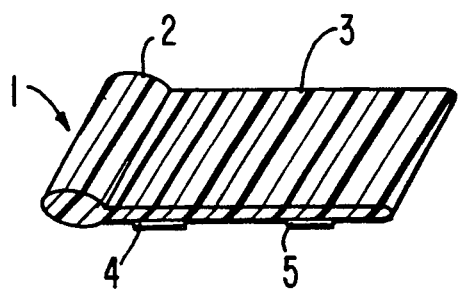
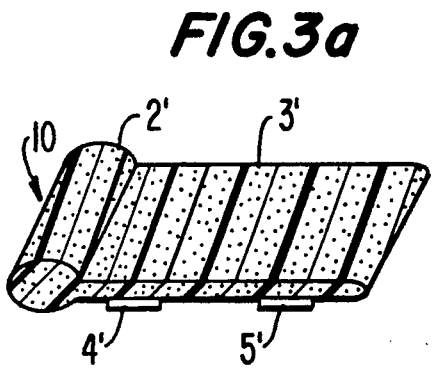
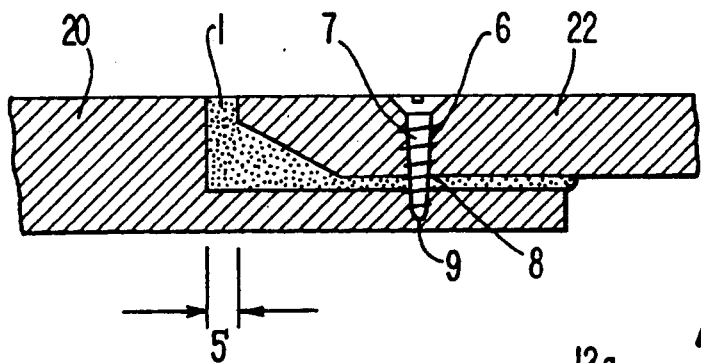
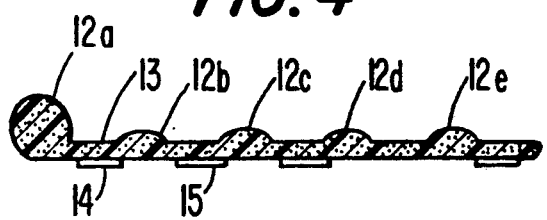

CONDUCTIVE SHIELDING AND SEALING TAPE

CROSS-REFERENCE TO RELATED APPLICATIONS

This application is a continuation-in-part of Application Ser. No. 07/290,539 filed on Dec. 27, 1988, now abandoned.

FIELD OF THE INVENTION

This invention relates to a sealing tape for sealing the joints and gaps between the edge of an opening in an aircraft fuselage and the lid covering the opening. The invention also relates to a sealing tape that provides for energy shielding, electromagnetic protection and environmental protection between the edge of an opening in an aircraft fuselage and lid covering the opening.

BACKGROUND OF THE INVENTION

In order for the parts found in an aircraft fuselage such as instruments, wiring, and other equipment to be accessible for servicing and repair work, openings are usually provided in the fuselage which are closed by tight fitting lids before the aircraft becomes operational. In order for a watertight seal to be provided, it was necessary to use "self-forming" seals wherein two components of the seal are mixed together and then applied very thinly to the sealing surface before the lid is secured in place.

To test for leaks, one must wait for the sealing compound to harden before performing a leak test on the aircraft using conventional technology. If leaks are detected, the lid must be taken up, sealing compound must be removed, and the sealing process repeated. The sealing compound requires about twelve hours to harden. Thus, the sealing of openings is often very time consuming and is a particular annoyance because the quality of the seal varies so broadly.

In addition, aircraft fuselage parts such as instruments, wiring, and other equipment must be protected from problems such as an electromagnetic pulse (EMP), a nuclear and electromagnetic pulse (NEMP), static dissipation, high temperature, solvent attack, chemicals, corrosion and outgassing of residual unreacted components.

Currently existing gaskets and shielding materials are limited in their ability to handle the broad spectrum of problems listed above. Often with currently existing materials, the shielding effectiveness decreases over time due to electromagnetic pulsing and lightning strikes. Also, gaskets containing a filler flake and shift due to flexing and high vibration. Existing gaskets also crack and glaze when exposed to temperature extremes, ranging from $-450°$ F. to $600°$ F. There is a need for a sealing tape that ensures an environmental seal and also provides for electrical and electromagnetic shielding.

BRIEF DESCRIPTION OF THE DRAWINGS

FIG. 1 shows a cross-sectional view of a sealing tape.

FIG. 1a shows a cross-sectional view of a conductive sealing tape.

FIG. 2 shows an edge area of an opening sealed by a lid in an aircraft fuselage.

FIG. 3 shows a perspective view of a sealing tape.

FIG. 3a shows a perspective view of a conductive sealing tape.

FIG. 4 shows a cross-sectional view of a second embodiment of a conductive sealing tape.

SUMMARY OF THE INVENTION

The invention provides a sealing tape for sealing joints and gaps in openings of an aircraft fuselage being of a one-piece porous polymeric material having a wide flat portion and an enlarged bulb portion preferably made of expanded polytetrafluoroethylene (PTFE).

In addition, a sealing tape 6 provided for sealing joints and gaps in openings of an aircraft fuselage being of a one-piece porous polymeric material impregnated with a highly conductive element, the construction similar to that described above.

DETAILED DESCRIPTION OF THE PREFERRED EMBODIMENTS

The present invention provides a sealing tape which not only has good sealing properties but also allows for fast processing.

The preferred embodiment is a sealing tape of a one-piece expanded PTFE construction having a relatively wide flat portion and a narrower enlarged bulb portion.

In the assembled state of the sealing tape, the bulb portion is located at the edge of the opening at the place corresponding to the greatest gap between the edge of the opening and the edge of the lid.

It is desirable that the profile piece be made of a porous polymeric material that has good sealing properties but also has relatively high compressibility so that a uniformly good seal can be obtained even in places where there are irregular gaps and spaces between the edge of the opening and the edge of the lid.

The present invention also provides a shielding against electrical and electromagnetic effects. Inventive sealing tapes with additional shielding properties is also of a one-piece design having a wide flat portions and a narrower enlarged bulb portion. Alternatively the tape may be a plurality of bulbous portions to be fitted and reduced in size during the application of the tape into the areas of the fuselage that need to be sealed.

The tape with conductive shielding properties is constructed of a porous polymeric material, preferably of expanded polytetrafluoroethylene (PTFE) made in accordance with the teachings of U.S. Pat. Nos. 3,953,566 and 4,187,390. In addition, the porous polymeric material may contain a filler of either a powder, particle, or fiber shaped constituent. In the preferred embodiments, a sealing tape is made of expanded PTFE that contains a filler where the filler comprises 5-85% by volume of the PTFE/filler composition. A preferable composition of PTFE filler for use as a sealing tape includes the filler comprising 30 to 50% by volume of the mixture.

Preferable fillers include highly conductive particles of carbon, graphite, aluminum, silver plated aluminum, copper, copper alloy, iron, iron alloy, nickel, cobalt, gold, silver, or silver plated copper.

A most preferred material for use as a sealing tape for air craft fuselage is made from Electro-Magnetic Interference (EMI) Shielding GORE-TEX ® Gasket Tape available from W. L. Gore & Associated, Inc.

Alternatively, the sealing tape may be constructed of expanded PTFE that has been plated with a metal. Such a plating process is described in U.S. Pat. Nos. 4,720,400 and 4,557,957. Preferred metal plating materials include silver, silver-copper alloys, gold, cobalt, platinum and copper alloys and most preferably copper, nickel, and tin.

The invention is best understood by reference to the drawings. According to FIG. 1, a sealing tape 1 consists of a one-piece profile piece of porous polymeric material, preferably of expanded polytetrafluoroethylene (hereinafter PTFE). The profile piece has a relatively wide flat portion 3 which is about 3–4 cm. wide and about between 0.3 and 1.5 mm, preferably 1 mm thick and an enlarged bulb portion 2 having the same width or narrower as the flat portion but having a thickness of between 1 to 5 mm, preferably 3.5 mm thick. On the underside of flat portion 3, there are self-adhesive strips 4 and 5 for sticking the sealing tape to an area to be sealed. FIG. 3 shows a perspective view of the strip. Alternatively, FIGS. 1a and 3a show the sealing tape 10 consisting of a one-piece profile piece of a conductive porous polymeric material. Preferred thicknesses of the wide flat portion 3' range from about 0.3 to 1.5 mm and thicknesses of the enlarged bulb 2' portion are about 1 to 5 mm. Similar to the sealing tape of FIG. 1, the conductive sealing tape may be provided with self-adhesive strips 4' and 5' for sticking the sealing tape to an area to be sealed. The self-adhesive strips may also contain a conductive adhesive.

According to FIG. 2, the opening in an aircraft fuselage 20 is closed by a lid 22, the edge of the lid being spaced from the edge of the opening in the fuselage 20 and attached by a screw 7 seated in bore 6 in the lid in such a way that the outside of fuselage 20 is flush with the outside of lid 22. In the gap between the edge of the lid and the edge of the opening, there is sealing tape 1 or 10 which due to its compressibility, changes its shape in such a way as to fill in completely the gap between the edge of the lid and the edge of the opening.

The width of the gap 5 is subject to fluctuation to which the sealing tape adapts well. Screw 7 engaging a bore 9 in the edge of the opening penetrates a hole 8 in sealing tape 1. After providing the sealing tape at the edge of the opening, one creates a hole 8 by simply piercing the sealing tape with a sharp tool.

In a second embodiment, shown in cross-section in FIG. 4, a sealing tape is provided in a one-piece construction having a plurality of relatively wide flat portions 13 and a plurality of narrower enlarged bulb portions 12a–e. As can be seen in FIG. 4, the bulb portions 12a–e are of varying size so that the proper bulb size can be fitted into the gap of the fuselage. The remaining bulb and flat portions which are unused may be cutoff and discarded.

A sealing tape made of expanded PTFE is particularly desirable because of its tensile strength and compressibility. For use in sealing the gaps and joints between openings and lids in aircraft fuselages, PTFE is particularly desirable because of its high resistance to chemicals including aircraft fuel, kerosene, corrosive acids, and oils typically used in the aircraft industry.

A sealing tape made of conductive PTFE as previously described has the same desirable properties of tensile strength, compressibility, and high resistance to chemicals. In addition, the sealing tape made of conductive PTFE enables it to perform well for most shielding applications. The sealing tape made of the EMI Shielding GORE-TEX Gasket Tape possesses similar properties to that of the gasket tape namely its high resistance to vibration, capability of maintaining shielding effectiveness even after exposure to electromagnetic pulses (EMP) such as exposures in the frequency range of 200 kilohertz to 18 gigahertz and capability of maintaining shielding effectiveness after exposure to nuclear electromagnetic pulses.

Both the sealing tape and conductive sealing tape provide high quality seals that enable a opening in aircraft fuselage to be sealed within a short time.

What is claimed is:

1. A sealing tape for sealing joints and gaps between the edge of an opening in an aircraft fuselage and a lid covering the opening comprising a one-piece construction of expanded polytetrafluoroethylene having a flat portion with a thickness of between 0.3 and 1.5 mm and an enlarged bulb portion having a thickness of between 1 and 5 mm.

2. A sealing tape according to claim 1 wherein said bulb portion has a round cross-section.

3. A sealing tape according to claim 1 wherein said bulb portion has an angular cross-section.

4. A sealing tape according to claim 1 wherein said bulb portion has an elliptical cross-section.

5. A sealing tape according to claim 1 further comprising self-adhesive strips on an underside area of said flat portion.

6. A conductive shielding and sealing tape for sealing joints and gaps between the edges of an opening in an aircraft fuselage and a lid covering the opening in an aircraft fuselage and a lid covering the opening comprising a one-piece construction of conductive expanded polytetrafluoroethylene having a plurality of wide flat portions with a thickness of between 0.3 and 1.5 mm and a plurality of enlarged bulb portions with a thickness between 1 and 5 mm wherein said each flat portion is disposed adjacent to at least one of said bulb portions and wherein said conductive expanding polytetrafluoroethylene is selected from the group comprising expanded polytetrafluoroethylene impregnated with a conductive filler and expanded polytetrafluoroethylene plated with a conductive metal.

7. A conductive shielding and sealing tape for sealing joints and gaps between the edge of an opening in an aircraft fuselage and a lid covering the opening comprising a one-piece construction of conductive expanded polytetrafluoroethylene having a flat portion with a thickness of between 0.3 mm and 1.5 mm and an enlarged bulb portion having a thickness of between 1 and 5 mm, wherein said conductive expanded polytetrafluoroethylene is selected from the group comprising expanded polytetrafluoroethylene impregnated with a conductive filler and expanded polytetrafluoroethylene plated with a conductive metal.

8. A conductive shielding and sealing tape according to claim 7 further comprising self-adhesive strips on an underside area of said flat portion.

9. A conductive shielding and sealing tape according to claim 7 wherein the conductive filler is selected from the group consisting of carbon, graphite, aluminum, silver-plated aluminum, copper, copper alloy, iron, iron alloy, nickel, cobalt, gold, silver, and silver plated copper.

10. A conductive shielding and sealing tape according to claim 7 wherein conductive metals for plating is selected from the group consisting of silver, silver-copper alloys, gold, cobalt, platinum, copper, copper alloys, nickel, and tin.

11. A conductive shielding and sealing tape according to claim 7 wherein the conductive filler is 5% to 85% by volume of the composition of expanded polytetrafluoroethylene and conductive filler.

12. A conductive shielding and sealing tape according to claim 10 wherein the conductive filler is 30% to 50% by volume of the composition of expanded polytetrafluoroethylene and conductive filler.

* * * * *